March 18, 1952     C. G. DUDIS     2,589,682
TYPE MEMBER
Filed May 19, 1949
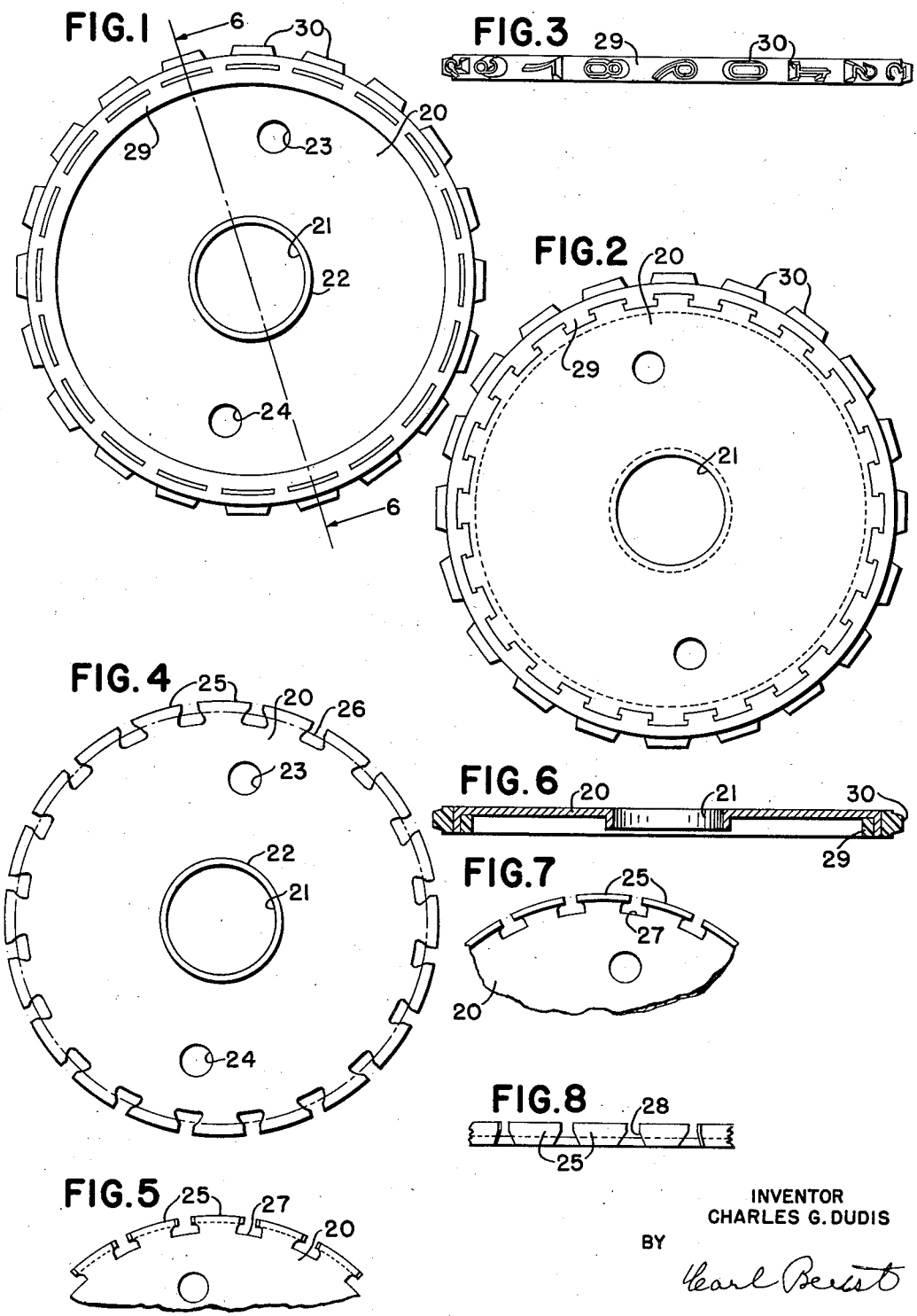
INVENTOR
CHARLES G. DUDIS
BY
*Earl Berist*
HIS ATTORNEY Patented Mar. 18, 1952

2,589,682

UNITED STATES PATENT OFFICE 2,589,682

TYPE MEMBER

Charles G. Dudis, Dayton, Ohio, assignor to The National Cash Register Company, Dayton, Ohio, a corporation of Maryland Application May 19, 1949, Serial No. 94,079

5 Claims. (Cl. 101—368)

This invention relates to an improved printing member of the type comprising a supporting portion to which is molded a type portion, the support and type portions being secured together by interlocking fit.

The invention particularly pertains to type wheels, type segments and type bars which are used in cash registers, calculating machines and the like, which must be lightly and strongly built. Molded type are preferable to engraved type because of the economy and speed of manufacture. Many of the plastic materials now available have wear resistance in printing operations comparable or better than steel but need substantial support against fracture and displacement.

It is an object of this invention to provide members wherein the support is interlocked with the type in all directions and adequately supports the type, the support being formed from sheet metal by simple stamping and bending operations.

The preferred embodiment of the invention has a steel support member to which is secured a nylon type portion and will be shown as a wheel type member, although the principle is applicable to segment type members and type bars.

Other metals such as aluminum, bronze, brass and the like may be used for the support if deemed to have better characteristics in connection with the intended use of the product.

Other plastic materials such as cellulose acetate-butyrate, rubber, artificial rubber, phenol formaldehyde resins, and the like may be substituted for the nylon.

The invention will be described in connection with the drawings in which:

Fig. 1 is a side elevation of one side of a type wheel embodying the invention.

Fig. 2 is the reverse side of the wheel of Fig. 1.

Fig. 3 is a top plan view of the wheel of Fig. 1.

Fig. 4 is a side elevation of the toothed metal disc forming the support of the wheel of Fig. 1, before the teeth are bent over.

Fig. 5 is a fragmentary view of the disc of Fig. 4 after the teeth are bent over.

Fig. 6 is a diametrical section through the wheel of Fig. 1 on the line 6—6, looking in the direction of the arrows.

Fig. 7 shows the reverse aspect of the substance of Fig. 5.

Fig. 8 is a plan view of the substance of Fig. 5.

The disc 20 (Fig. 4), of steel or other metal, is first formed with an axial hole 21 having a hub portion 22 and having two holes 23 and 24 aiding in positioning the wheel relative to a molding die which is described in a copending application, Serial No. 97,251, filed June 4, 1949, said application being directed to the process for making the type wheel herein described. The disc also has a plurality of radial teeth 25 flaring outwardly. These teeth are alike and equally spaced around the periphery of the disc.

The disc is next formed by bending over each tooth approximately mid-way between the base and the end on the dotted line 26. The teeth are all bent to the same side to an angle of 90° from the plane of the disc. Figs. 5 and 6 show the dove-tail or keyed openings, such as opening 27, between the unbent portions of the teeth. Fig. 8 shows similar dove-tail openings, such as opening 28, between the bent-over portions of the teeth. These openings and teeth form efficient interlocking formations to which the type material may be secured against movement. In addition, each bent-over portion of a tooth may be used to back up a type character against the radially acting forces a type wheel encounters in a printing impression.

Type material chosen from the kinds mentioned is then molded in and around the teeth to form the band 29 with the projecting type characters 30 thereon, each supported by the bent-over portion of a tooth.

It will be apparent that the type member need not be circular but may be segment shaped or bar shaped as is common in calculating and registering machines. It also will be apparent that there need not be a type character for each tooth or need they be spaced evenly.

What is claimed is:

1. A printing member including, in combination, a supporting member having a type-receiving portion of bent-over flaring teeth, the flare of each tooth causing it to widen outwardly from its base, and the bend occurring between the base and the end of each tooth; and type material interlockingly secured around and between the teeth, there being molded type characters on a printing surface of the type material, each character having a tooth supporting it in the line of a printing impression.

2. The device of claim 1 in which the teeth are bent at right angles to the rest of the supporting member and in the same direction therefrom.

3. The device of claim 2 in which the unbent portion of the supporting member is a disc except for the unbent tooth portions.

4. The device of claim 2 in which the type material forms a circular peripheral band in which the teeth are embedded.

5. The device of claim 1 in which the type material is nylon.

CHARLES G. DUDIS.

REFERENCES CITED

The following references are of record in the file of this patent:

UNITED STATES PATENTS

| Number | Name | Date |
|---|---|---|
| 582,801 | Wirsching | May 18, 1897 |
| 956,891 | Dement | May 3, 1910 |
| 1,925,363 | Apple | Sept. 5, 1933 |
| 2,282,448 | Beck | May 12, 1942 |

FOREIGN PATENTS

| Number | Country | Date |
|---|---|---|
| 4,392 | Great Britain | of 1897 |